United States Patent
Miles et al.

(10) Patent No.: US 11,928,153 B2
(45) Date of Patent: Mar. 12, 2024

(54) MULTIMEDIA LINKED TIMESTAMP VALIDATION DETECTION

(71) Applicant: Kyndryl, Inc., New York, NY (US)

(72) Inventors: Caleb Miles, Columbia, MO (US); Clement Decrop, Arlington, VA (US); Zachary A. Silverstein, Georgetown, TX (US); Shikhar Kwatra, San Jose, CA (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/697,048

(22) Filed: Mar. 17, 2022

(65) Prior Publication Data

US 2023/0297615 A1 Sep. 21, 2023

(51) Int. Cl.
| G06F 15/16 | (2006.01) |
| G06F 16/74 | (2019.01) |
| G06F 16/955 | (2019.01) |
| G06F 40/40 | (2020.01) |

(52) U.S. Cl.
CPC ........ *G06F 16/748* (2019.01); *G06F 16/9558* (2019.01); *G06F 16/9566* (2019.01); *G06F 40/40* (2020.01)

(58) Field of Classification Search
None
See application file for complete search history.

(56) References Cited

U.S. PATENT DOCUMENTS

| 8,595,375 | B1 | 11/2013 | Kuznetsov |
| 9,966,112 | B1 | 5/2018 | Kulkarni et al. |
| 10,198,444 | B2 | 2/2019 | Basapur et al. |
| 10,326,847 | B1 * | 6/2019 | Jammalamadaka .. H04W 4/021 |
| 10,714,145 | B2 | 7/2020 | Kulkarni et al. |
| 11,423,491 | B1 * | 8/2022 | O'Connor .......... G06Q 20/0855 |
| 2013/0290892 | A1 | 10/2013 | Basapur et al. |
| 2015/0127748 | A1 * | 5/2015 | Buryak .................... H04L 51/52 |
| | | | 709/206 |
| 2019/0156350 | A1 * | 5/2019 | Jaroch ................ G06Q 30/0201 |
| 2021/0089579 | A1 * | 3/2021 | Shu ...................... G06F 16/9035 |
| 2021/0157858 | A1 * | 5/2021 | Stevens ............. G06F 16/90335 |
| 2022/0279014 | A1 * | 9/2022 | Stokes, III ............ G06F 21/566 |
| 2022/0292154 | A1 * | 9/2022 | Ivry ...................... G06F 16/906 |

OTHER PUBLICATIONS

Mell et al., "The NIST Definition of Cloud Computing", NIST, Special Publication 800-145, Sep. 2011, 7 pages.

(Continued)

*Primary Examiner* — Phuoc H Nguyen
(74) *Attorney, Agent, or Firm* — Erik Swanson; Andrew M. Calderon; Calderon Safran & Cole P.C.

(57) ABSTRACT

A computer-implemented method, including: receiving, by a computing device, a post referring to a multimedia content; identifying, by the computing device, a time in the post; generating, by the computing device, a validity score based on analyzing contextual data of the time in the post; determining, by the computing device, a correlation between the time in the post to the multimedia content based on the validity score; and publishing, by the computing device, the post with an interactive link to a corresponding time of the multimedia content based on the determined correlation.

20 Claims, 6 Drawing Sheets

(56) References Cited

OTHER PUBLICATIONS

Justin, "Video Featured Snippets: How Suggested Clips Work", Briggsby, https://www.briggsby.com/video-featured-snippets-suggested-clips, Aug. 1, 2018, 19 pages.

Derral Eves, "How To Add A TimeStamp Link In Your YouTube Video Description", http://youtu.be/C5zzVemi3m4, uploaded Nov. 6, 2014, 3 pages.

Jared Polin, "How To Jump To A Specific Time On YouTube In The Description Or Comment", https://www.youtube.com/watch?v=SRT9-yPkKig, uploaded Jun. 9, 2014, 2 pages.

\* cited by examiner

MULTIMEDIA LINKED TIMESTAMP VALIDATION DETECTION

BACKGROUND

Aspects of the present invention relate generally to timestamp detection in posts related to multimedia and, more particularly, to determining validity of a timestamp in a post through contextual processing. The contextual processing is applied to at least both the multimedia associated with the post and the post itself.

SUMMARY

In a first aspect of the invention, there is a computer-implemented method including: receiving, by a computing device, a post referring to a multimedia content; identifying, by the computing device, a time in the post; generating, by the computing device, a validity score based on analyzing contextual data of the time in the post; determining, by the computing device, a correlation between the time in the post to the multimedia content based on the validity score; and publishing, by the computing device, the post with an interactive link to a corresponding time of the multimedia content based on the determined correlation.

In another aspect of the invention, there is a computer program product including one or more computer readable storage media having program instructions collectively stored on the one or more computer readable storage media. The program instructions are executable to: receive a post referring to a video; identify a time in the post; generate a validity score based on analyzing contextual data of the time in the post; responsive to determining a correlation between the time in the post to a corresponding time of the video based on the analyzed contextual data, publish the post with an interactive link to the corresponding time in the video; and responsive to determining a lack of correlation between the time in the post to a corresponding time of the video based on the validity score, publish the time in the post as text without an interactive link.

In another aspect of the invention, there is system including a processor, a computer readable memory, one or more computer readable storage media, and program instructions collectively stored on the one or more computer readable storage media. The program instructions are executable to: receive a post referring to a multimedia content; identify a time in the post; analyze contextual data of the time in the post, the analyzing including: scoring the contextual data of the time in the post indicating whether the time in the post is a valid timestamp, and weighting the scored contextual data to generate a validity score; determine a lack of correlation between the time in the post to a corresponding time in the multimedia content based on the validity score; and publish the time in the post as text without an interactive link.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
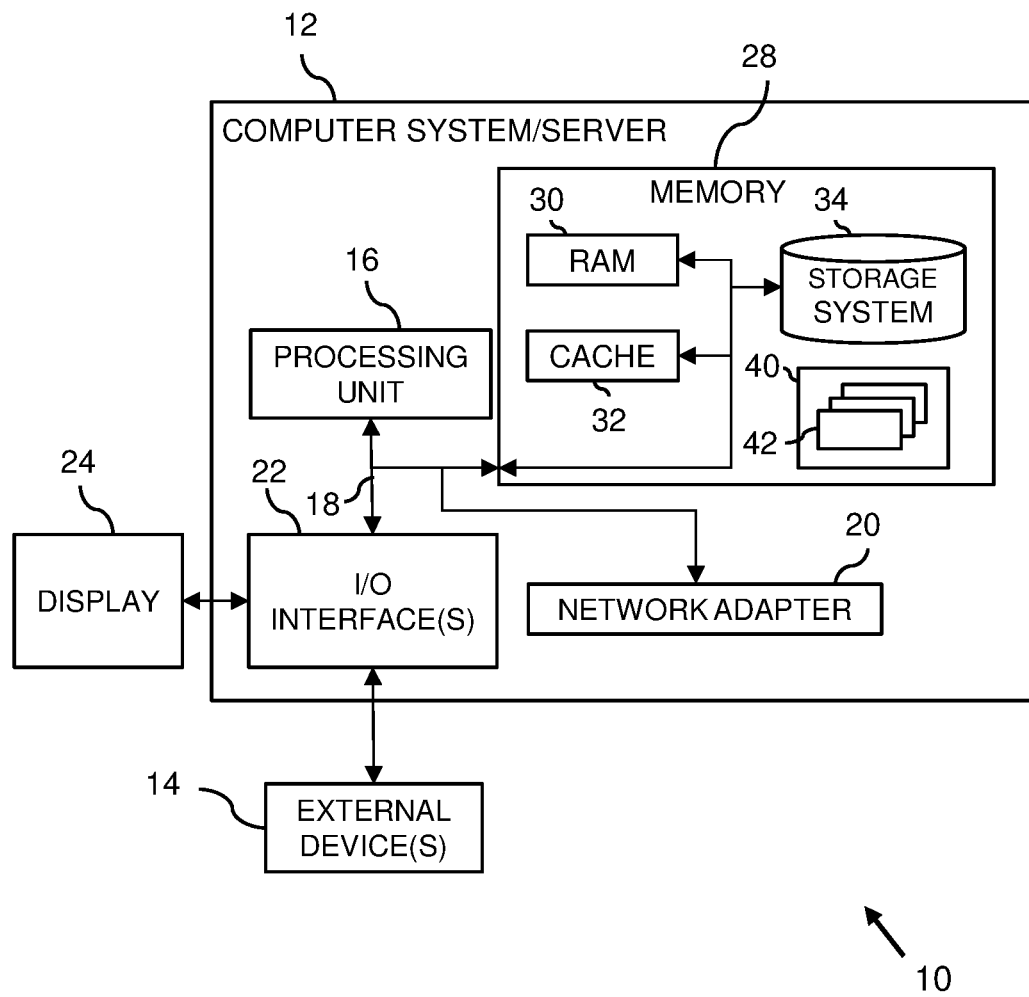
FIG. 1 depicts a cloud computing node according to an embodiment of the present invention.

Aspects of the present invention relate generally to timestamps in user posts and, more particularly, to timestamp validity determination using a context analysis. In embodiments, a computing device, including servers, desktops, phones, laptops, touchpads, or other networked computing devices facilitate timestamp validity determination. In this manner, implementations of the invention provide timestamp validity determination based on contextual analysis of a potential timestamp.

Some multimedia applications and websites automatically create a timestamp link (i.e., an interactive link such as a hyperlink that is user-selectable) based on times detected in user comments. For example, a multimedia application/website may be part of an online video sharing and social media platform where users can post videos for other users to watch and comment upon. When a user posts a comment in the comment section of a video, the multimedia application/website detects whether the comment includes (e.g., mentions) a time. When the multimedia application/website detects a time in a comment in this manner, the multimedia application/website automatically generates an interactive link in the comment. The interactive link is a selectable object that links to a time in the video. For example, if a comment includes the text "3:00" then the system creates an interactive link to the 3:00 time in the video. As such, when another user views the comment that includes the interactive link, the other user can select the interactive link (e.g., click it with a cursor or tap it with their finger) and automatically be taken to the time in the video. In the example mentioned above, a user clicking the interactive link in the comment causes the system to go directly to the 3:00 time in the video. A problem arises, however, when a comment in the comment section of a video includes a time that does not refer to a time in the video. In the example mentioned above, the text "3:00" in the comment may refer to a time of day and not to a time in the video. In this situation, the multimedia application/website automatically generates an interactive link in the comment based on the text "3:00." However, the linked 3:00 time in the video may have nothing to do with the context of the comment, such that users that select the interactive link and are directed to the 3:00 time in the video may be confused. In some instances, users may even be notified that the interactive link is broken when the linked time is outside of a completion time of the video. For example, if the video was 2:45 long (2 minutes and 45 seconds) and the interactive link is created for 3:00.

In aspects of the invention, there is a method for correcting invalid casting of comments and decryptions into a linked bookmark of multimedia content (e.g., sending a user to the time indicated in the multimedia content), including: receiving data referring to content of a video, the data including a comment; detecting timestamp information in the comment; storing the received data and historical data in a storage system; analyzing the comment for an indicator of a timestamp, the timestamp being analyzed for validity of the indicator using scoring tests, the scoring tests including a relation to the video at the timestamp; scoring the comment for validity; weighting the scores for being relevant to the comment; and determining an action for the comment based on the weighted scores for the comment. The method may further include posting the comment without the timestamp information; requesting additional information from a user; and posting the comment with the timestamp information.

Implementations of the invention provide an improvement in the technical field of timestamp post management by providing a technical solution to the problem of linking to invalid timestamps. In embodiments, the technical solution involves: receiving a post associated with a multimedia content, the post including a time that is identified; determining that the time is a valid timestamp based on contextual data from the post and the multimedia content; and generating an interactive link to the time in the multimedia content based on the timestamp being valid. These steps allow the validation detection device to better manage interactive links of a timestamp in posts and more efficiently provide users with interactive links of a timestamp to a multimedia content without the broken links. Implementations of the invention utilize context analyzers such as machine learning and/or natural language processing models to better determine a contextual use of a time in a user's post. The term "machine-learning"—and based on that the term "machine-learning model" or "machine learning processing"— may denote known methods of enabling a computer system to improve its capabilities automatically through experience and/or repetition without procedural programming. Thereby, machine-learning can be seen as a subset of artificial intelligence. Machine-learning algorithms build a mathematical model—i.e., the machine-learning model—based on sample data, known as "training data", in order to make predictions or decisions without being explicitly programmed to do so.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
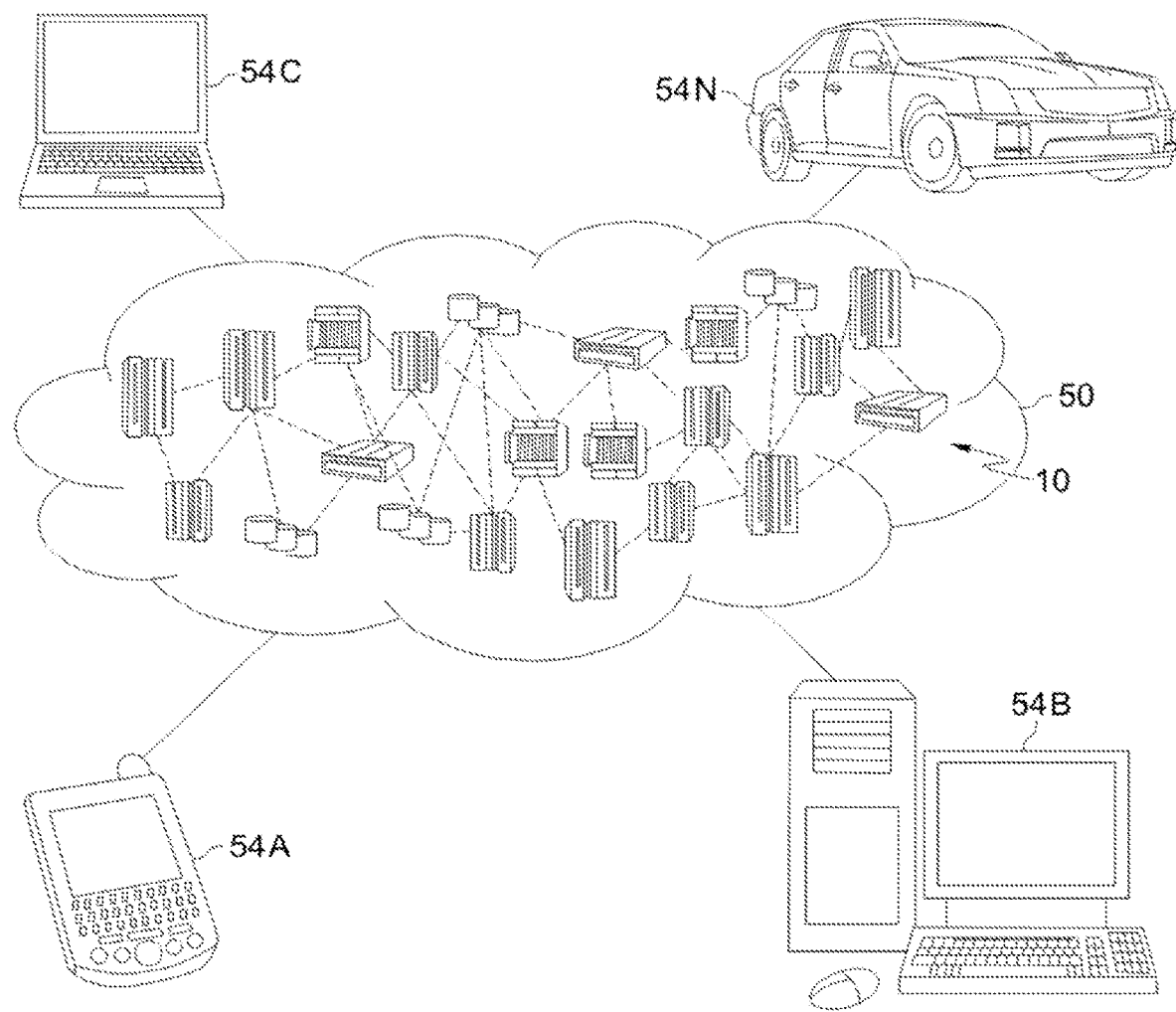
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
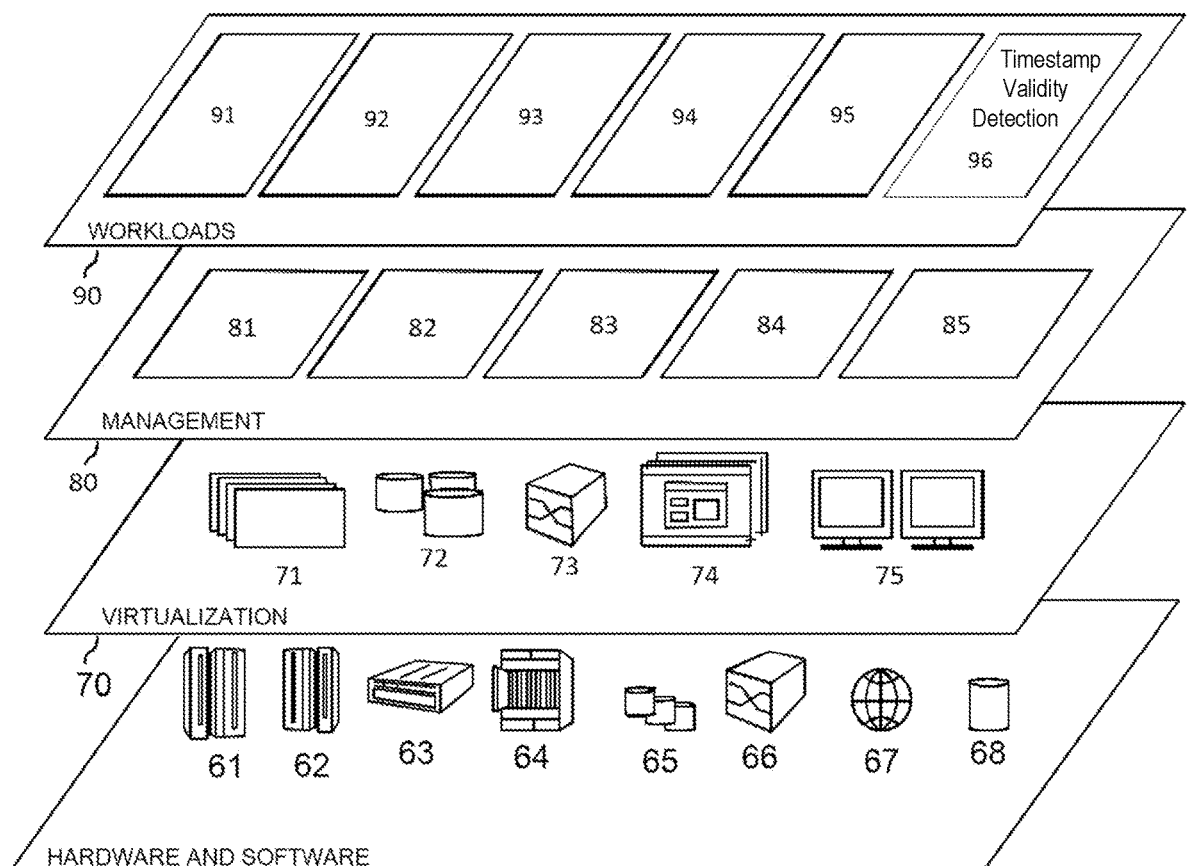
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and timestamp validity detection 96.

Implementations of the invention may include a computer system/server 12 of FIG. 1 in which one or more of the program modules 42 are configured to perform (or cause the computer system/server 12 to perform) one or more functions of the timestamp validity detection 96 of FIG. 3. For example, the one or more of the program modules 42 may be configured to: receive, by a computing device, a post referring to a multimedia content; identify, by the computing device, a time in the post; analyze, by the computing device, a contextual data of the time in the post, the analyzing including: score, by the computing device, the contextual data of the time indicates whether the time is a valid timestamp, and weight, by the computing device, the scored contextual data that generates a validity score; determine, by the computing device, a correlation between the time in the post to the multimedia content based on the analyzed contextual data; and publish, by the computing device, the post with an interactive link to the time corresponding to the multimedia content based on the correlation between the time in the post to the multimedia content.

Figure 4:
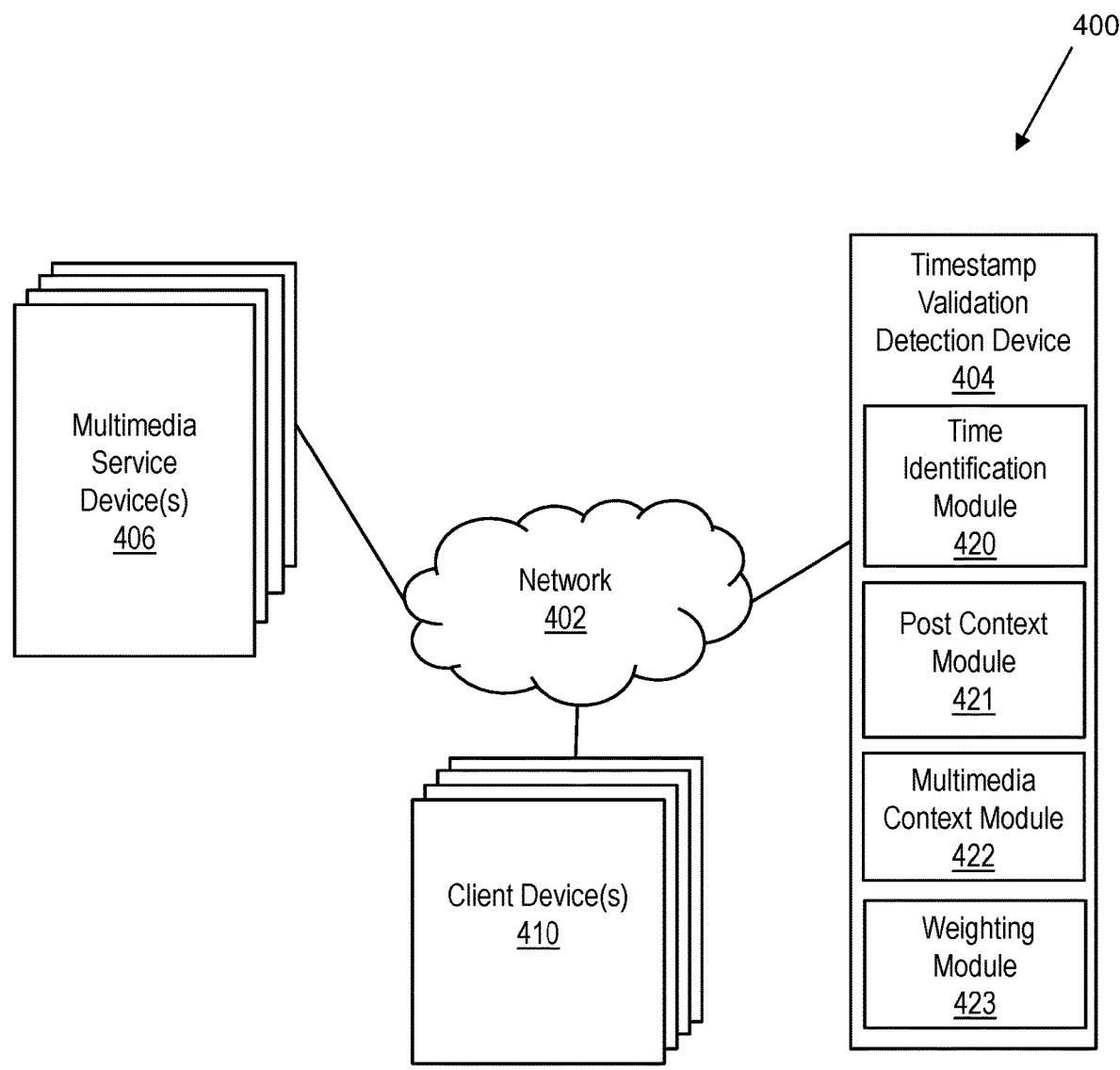
FIG. 4 shows a block diagram of an exemplary environment in accordance with aspects of the invention.

FIG. 4 shows a block diagram of an exemplary timestamp validity determination environment 400 in accordance with aspects of the invention. In embodiments, the timestamp validity determination environment 400 includes a network 402 enabling communication between timestamp validation detection device 404, multimedia service device(s) 406, and client device(s) 410.

In embodiments, the timestamp validation detection device 404 may comprise the computer system/server 12 of FIG. 1, or elements thereof. In embodiments, the timestamp validation detection device 404 may be a computing node 10 in the cloud computing environment 50 of FIG. 2. In embodiments, the timestamp validation detection device 404 comprises one or more modules, each of which may comprise one or more program modules such as program modules 42 described with respect to FIG. 1. In embodiments, the timestamp validation detection device 404 may be part of a web hosting service or the multimedia service device(s) 406.

In the non-limiting exemplary embodiment of FIG. 4, timestamp validation detection device 404 comprises a time identification module 420, post context module 421, multimedia context module 422, and weighting module 423, each of which may comprise one or more program module(s) 42 of FIG. 1, for example. The timestamp validation detection device 404 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the time identification module 420 is configured to identify times in a post by analyzing the text in the post (i.e., an identified time verbiage). The identified time includes dates and/or times embedded in the post. The dates and times may be posted in word or time concepts. Word concepts include year, month, date, times (e.g., ten o'clock, half-past four, six minutes and twenty-two seconds), time of day (e.g., morning, noon, afternoon, evening, A.M., P.M., etc.). Time concepts include times written in 12-hour time (e.g., 4:00 PM) or 24-hour time (e.g., 1600 hours), the time concepts may be in one of many forms including: hh:mm:ss; h:mm; mm:ss; m:ss; hhmm (where 'h' is for digits that indicate hours, 'm' is for digits that indicate minutes, and 's' is for digits that indicate seconds) or any other form that may convey a time. In embodiments, the time identification module 420 analyzes the identified time(s) to determine whether they indicate an absolute time (e.g., time of day, actual time which would be an invalid timestamp) or relative time (e.g., hh:mm:ss that may refer to a time format which would be a valid timestamp). Indications of an absolute time show the identified time(s) in the post should not be linked and do not correlate to the multimedia content itself. Indications to a relative time show the identified time(s) may refer to a time of the multimedia content. Although the instant application may reference to absolute time and relative time, these terms are generally used to indicate the validity of an identified time as a timestamp, where absolute time indicates an invalid timestamp and relative time indicates a valid timestamp (e.g., that can be used as an interactive link to provide a pointer to the same time in the multimedia content).

Indicating factors of absolute and relative time may include one or more of: a time format comparison; an identified time verbiage; an object recognition in the multimedia content; an absolute time contextual association(s) with the identified time; a natural language processing of the post for extracting elements to provide contextual data of the identified time; the identified time in the post being directed at the multimedia content; an association of the identified time of the post with the identified time in other associate comments; and an association of the identified time with a magnitude of the time of the multimedia content and/or time of playback during the post.

In embodiments, the time identification module 420 compares a time format of the identified time(s) and their word and time concepts against a time format of the multimedia content to determine whether the time formats match (i.e., the time format comparison). For example, a time format of mm:ss in a post does not match a time format of hh:mm:ss in the multimedia content, whereas a time format of mm:ss in a post does match a time format of mm:ss in the multimedia content. If the time formats match, then it is more likely that the identified time (in the post) refers to a time in the multimedia content. On the other hand, if the time formats do not match, then it is less likely that the identified time (in the post) refers to a time in the multimedia content.

In embodiments, the time identification module 420 compares the identified time(s) against a magnitude of the multimedia content (i.e., the association of the identified time with a magnitude of the time of the multimedia content). For example, the identified time(s) are compared against a completed playback time of the multimedia content. In a non-limiting exemplary embodiment, the completed playback time comprises a final timestamp for complete playback of the multimedia content. For example, the completed playback includes the full length of the multimedia content. In a non-limiting exemplary embodiment, the completed playback time includes an ending time of playback by the user of the multimedia content. For example, the complete playback time includes the time when the user ends playback of the multimedia content. One example of using the completed playback time includes: the time identification module 420 comparing the completed playback time of the multimedia content that is 00:20:34 (hh:mm:ss) with an identified time (in a post) of 12:10 (which might indicate hh:mm or mm:ss). The identified time is assumed to be in either time format and considered to indicate a relative time of the multimedia content if in the mm:ss time format, and to indicate an absolute time if in the hh:mm time format. If the identified time is 40:22, then the identified time indicates an absolute time because the identified time is out of the bounds of the completed playback time.

In embodiments, the time identification module 420 compares identified time(s) in the same post against one another. For example, a post includes "I just woke up at 6 AM and finished watching this video in 5 minutes." In this example, the identified times are related and indicate absolute times.

In a non-limiting exemplary embodiment, the time identification module 420 tracks the progress of a user watching the multimedia content (i.e., a temporal location in the multimedia content of a user's playback) and compares the time of the post, during the playback of the multimedia content, to the identified time(s) (i.e., the association of the identified time with a time magnitude of the time of playback of the multimedia content during the post). For example, a user posts a comment during playback at a playback time of 01:23:56 with an identified time of 02:32:13. The identified time indicates an absolute time because it is out of the bounds of the playback time even if the completed playback time of the multimedia content is 03:12:10. In another example, a user posts a comment at the same time with an identified time of 04:12. The identified time is assumed to be in either time format hh:mm or mm:ss. Thus, if in hh:mm the identified time indicates an absolute time and if in mm:ss the identified time indicates a relative time.

In embodiments, the post context module 421 is configured to determine context to the post itself (i.e., an absolute time contextual association(s) with the identified time). The post context module 421 analyzes the words surrounding the identified time(s) to provide a context to the identified time(s). For example, a user decides to comment with a post saying "I woke up at 6 AM to watch this movie." The identified time of 6 AM is received from the time identification module 420. In this example, the post context module 421 analyzes the post and extracts elements in the post to determine a context surrounding the identified time by identifying "woke" as an extracted element of contextual data to the identified time. In embodiments, this contextual data may be matched to a database of contextual data (e.g., time-based verbiage such as breakfast/lunch/dinner, slept/woke/napped, etc.).

In embodiments, the post context module 421 determines the post includes language specifically pointing to a time of the multimedia content (i.e., the identified time in the post being directed at the multimedia content). For example, the post includes "at the 3:13 mark of the content." Such a context clearly indicates a relative time as the time is "of the content."

In embodiments, the post context module 421 determines contextual data using machine learning based natural language processing models of the post. Such models may include, but are not limited to, bidirectional encoder representations from transformers (BERT) model. The BERT model may account for many parameters including token embeddings, segment embeddings, and positional embeddings of the identified time(s). In token embeddings a classification (CLS) token is added to the input word tokens at the beginning of the first sentence and a separation (SEP) token is inserted at the end of each sentence. In segment embeddings, a marker indicating sentence A or sentence B (and so on) is added to each token to distinguish between each sentence. In positional embeddings each token includes a positional embedding to indicate position in a sentence. The identified time(s) are plotted against all the language as absolute or relative time contexts and based on this plotting, indicate the identified time(s) are either an absolute time or a relative time.

In embodiments, the natural language processing models extract elements from the post to provide a context to the identified time(s) (i.e., a natural language processing of the post for extracting elements to provide contextual data of the identified time). In embodiments, the post context module 421 is configured to compare the extracted elements from the post to metadata of the multimedia content. For example, multimedia content metadata may include a subject matter of the content (e.g., "horror movie") and extracted elements from the post may be compared to a horror movie context. In other words, extracted elements such as 'skeleton' or 'monster' would indicate a relative time context to any times identified in the post. In embodiments, the natural language processing models use word vectors and associations to extract elements from the post. For example, the natural language processing model may extract a word 'family' and its associations using word vectoring (e.g., 'brother,' 'sister,' 'mother,' 'father,' etc.) which may relate to a multimedia content showing family members talking. In embodiments, the post context module 421 is configured to retrieve or receive posts with similar timestamps embedded in the posts and compare these posts against the identified time(s) and post. For example, many posts in a posting board of a multimedia content may include similar times 3:10, 03:11, 310, 0309, etc., or comments under the same hierarchy that may indicate something exciting, special, or notable in the video, or something discussed about in the video to determine whether the identified time is an absolute or relative time. Identified times with many similar comments may indicate a relative time and identified times with few comments may indicate an absolute time. In embodiments, the post context module 421 also compares extracted elements in the post to extracted elements in the other associated posts.

In embodiments, the multimedia context module 422 is configured to use multimedia content analysis that determines a relationship between the time and the multimedia content. In non-limiting exemplary embodiments, the multimedia content analysis includes multimedia content processing including image/video/audio processing to extract entities (i.e., objects and/or concepts) from the multimedia content at a time in the multimedia content that corresponds to the identified time in the post. A combination of extracted entities may indicate a concept. For example, extracting a crowd of people, the people dressed in costume, may indicate the video being set during Halloween. In embodiments, the multimedia content processing may include a machine learning modelling for better extraction of entities from the multimedia content. In embodiments, the multimedia context module 422 is configured to compare the extracted entities to concepts in the post and to use this comparing when determining whether the identified time is more likely to be a relative time or an absolute time. In embodiments, the system uses convolutional neural networks (CNN) image processing and optical character recognition (OCR) models to analyze video of the multimedia content for entity extraction. In embodiments, where the multimedia content includes audio, the system may extract entities from the audio using natural language processing of a transcript of the audio. In embodiments, the entities are extracted at or near the identified time of the video/audio content. For example, based on determining an identified time as 4:23, the multimedia context module 422 may extract entities from the multimedia content at the 4:23 time in the multimedia content (plus or minus a predefined amount of time, such as 10-15 seconds).

In accordance with aspects of the invention, the system compares the extracted entities to concepts in the post (e.g., as determined by the post context module 421) to determine whether the extracted entities match the concepts. If the extracted entities match one or more concepts in the post, then it is more likely that the identified time (in the post) refers to a time in the multimedia content. On the other hand, if the extracted entities do not match one or more concepts in the post, then it is less likely that the identified time (in the post) refers to a time in the multimedia content. For example, a user may post "that's a crazy jump at 3:00 into the video." In this example, the system analyzes the video between 2:50 and 3:10 and extracts an entity of a person jumping. Based on the extracted entity (e.g., the person jumping) matching the concept in the post (e.g., jump), the system determines that the identified time in the post (e.g., 3:00) refers to a time in the video (e.g., is a relative time). In embodiments, an extracted entity matching a concept in a post indicates an event of interest seen/heard in the multimedia content.

In embodiments, the event of interest indicates the identified time is a relative time. In embodiments, the multimedia context module 422 may be configured to work with the post context module 421 to compare results from each module. For example, the multimedia context module 422 may receive contextual language from the post context module 421 and compare the contextual language to entities extracted from the multimedia content. In embodiments, a match based on this comparison indicates an event of interest is discussed in the post, such that the identified time is deemed a relative time. In embodiments, a non-match based on this comparison causes the system to deem the identified time as an absolute time.

In embodiments, the weighting module 423 is configured to provide a score to each of the indicating factors described above, including at least one of: a time format comparison; an identified time verbiage; an object recognition in the multimedia content at or near the identified time in the post; an absolute time contextual association with the identified time; a natural language processing of the post for extracting elements to provide contextual data of the identified time (e.g., for comparing with the objects recognized in the multimedia content, comparing extracted elements of the post with extracted elements of the other associated posts, and determining context of the identified time(s) in relation to the extracted elements); an association of the identified time of the post with the identified time in other associated comments; the identified time in the post being directed at the multimedia content; and an association of the identified time with a magnitude of the time of the multimedia content and/or time of playback during the post. Each factor may include a score for assuming that the identified time is an absolute time and a score assuming that the identified time is a relative time.

In embodiments, each score may then be weighted based on a predetermined or machine learned priority to each factor. A score may be increased or reduced by a factor based on how strongly the score indicates an absolute or relative time. In embodiments, each score lies within a same range (e.g., between 0 and 100) and each weight total may be a maximum of 100. Thus, each score (i.e., each factor) may initially be weighted the same (e.g., by a factor of 2 for five factors). However, based on confidence in the contextual data indicating absolute or relative time, the weighting may be adjusted so a strong indication of relative time would factor by 0.4 instead of 0.2 or for a weak indication, the weighting would reduce to a factor of 0.1. This total weighting indicates a confidence level in the validity of the identified time and a confidence level in the score for each factor.

For example, in a non-limiting exemplary embodiment, in the case where the identified time does not match the completed playback time of the multimedia content (e.g., identified time is 16:23:10 and completed playback time is 01:30:26), the absolute time score is multiplied by a factor of 0.5 to overcome any indications that the identified time indicates a relative time. In embodiments, other factors may have a reduced weighting factor of less than one. The weighted scores can then be summed as a total to determine a validity score (i.e., confidence score in the validity or invalidity of the identified time). The validity score includes a comparison of each of the summed weighted absolute time and relative time scores. If the difference between the scores is small, then the validity score is non-decisive. If the difference is large, the larger score is the validity score and indicates whether the identified time is an absolute time (i.e., invalid) or relative time (i.e., valid). In an instance where the magnitudes do match, that factor provides less confidence and remains at a factor of 0.2 and other factors such as matched extracted elements of the post and extracted entities of the multimedia content would increase to a factor of 0.3.

In another non-limiting exemplary embodiment, the identified time includes a date and is more likely to be an absolute time. Thus, the factor for the identified time verbiage is increased. In embodiments, the distance (i.e., the number of words, sentences, or paragraphs) between the time and date in the post is factored into whether an identified time indicates an absolute time. If separated by sentences, the date may not be an indication of absolute time for the identified time. If separated by a few words, the date is more likely to be an indication of absolute time.

In embodiments, a post is analyzed using the timestamp validation detection device 404 in real-time to determine whether an identified time is a valid timestamp before posting. For example, a user may be typing the text of the post and as a time entry is identified a context of the identified time is analyzed. This may result in initially missing context in text that is after the identified time. However, the later text is accounted for with continued analysis. In embodiments, the post is analyzed after the text for the post is completed and the user has initiated the posting. This allows for more context to be collected since responses by other users to the post may also be factored. For example, a user may select to post their text, the text in the post is then analyzed prior to posting to prevent posting with invalid timestamps. Another user then responds to the post with additional information about the same time, which indicates a valid timestamp. In non-limiting exemplary embodiments, the text is posted and then analyzed and the timestamp validation detection device 404 will only edit the text with a generated interactive link for valid timestamps. For example, the text is posted without linked timestamps and the timestamp validation detection device 404 will generate and add interactive links based on determining identified times in the post are valid timestamps. In non-limiting exemplary embodiments, the text is posted with an interactive link on all identified times and then analyzed to remove interactive links to the invalid timestamps.

The multimedia service device(s) 406 may comprise computing devices (e.g., the computer system/server 12 of FIG. 1, or elements thereof) in a networked environment. In implementations, the multimedia service device(s) 406 comprise personal computing devices (e.g., 54A, 54B, 54C, etc.) in the cloud computing environment 50 of FIG. 2. The multimedia service device(s) 406 may comprise one or more program modules such as program modules 42 described with respect to FIG. 1. In accordance with aspects of the invention described below, the multimedia service device(s) 406 may store and manage access to multimedia content for consumption by users of client device(s) 410, as well as host postings associated with the multimedia content. The multimedia service device(s) 406 may store a database linking to multimedia content storage devices or store the multimedia content itself. Although the instant application may reference the user comments as a post particularly, all these terms including "posts", "comments", "blogs", "feeds", "chats", "reviews", etc. may be used interchangeably.

The client device(s) 410 may comprise computing devices (e.g., the computer system/server 12 of FIG. 1, or elements thereof) in a networked environment. In implementations, the client device(s) 410 comprise personal computing devices (e.g., 54A, 54B, 54C, etc.) in the cloud computing environment 50 of FIG. 2. The client device(s) 410 may comprise one or more program modules such as program modules 42 described with respect to FIG. 1. In implementations, the client device(s) 410 enable a user to post to multimedia service device(s) 406 or other web hosting services that associate user posts to a multimedia content for consumption.

Figure 5:
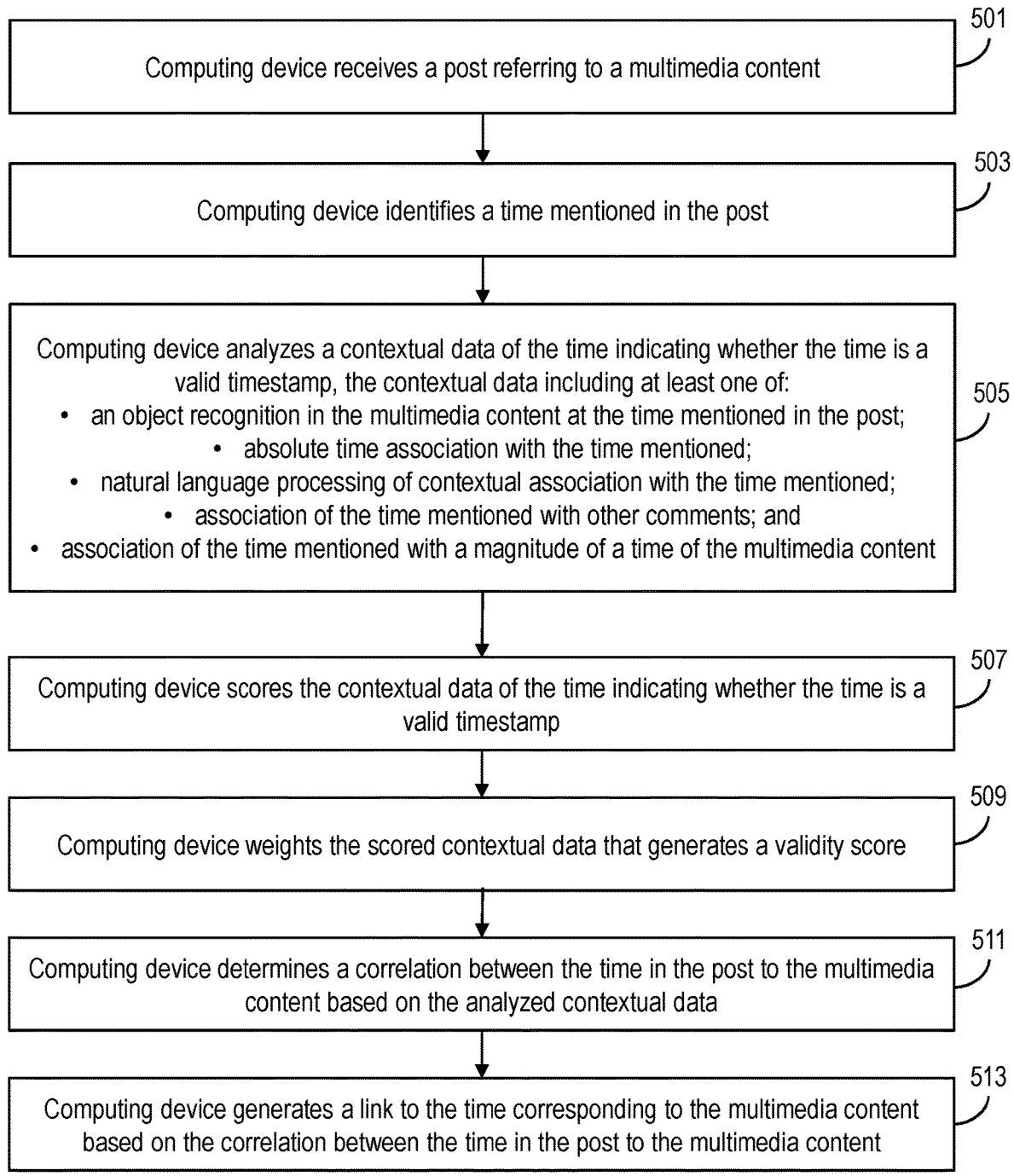
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the timestamp validation detection device 404 of FIG. 4, receives a post referring to a multimedia content. In embodiments, the multimedia service device(s) 406 sends the timestamp validation detection device 404 posts which have been made on a message or comment board of the multimedia content or have been made about the multimedia content (e.g., linking to the multimedia content). In embodiments, the multimedia service device(s) 406 sends the posts in response to a user attempting to post on a message or comment board of the multimedia content. In embodiments, the timestamp validation detection device 404 monitors and retrieves any new posts from the multimedia service device(s) 406. In embodiments, the multimedia content includes videos, audio, or other temporal multimedia.

At step 503, the timestamp validation detection device 404 of FIG. 4, identifies a time mentioned in the post. In embodiments, the timestamp validation detection device 404 analyzes text in the post to identify a date and/or time. The identified times themselves may be matched to a database of time-based verbiage as a word context or time context and are used to determine an identified time indicates absolute or relative time.

At step 505, the timestamp validation detection device 404 of FIG. 4, analyzes contextual data of the time indicating whether the time is a valid timestamp. In embodiments, the timestamp validation detection device 404 determines the contextual data is associated with the identified time(s) via context drawn from the post and/or multimedia content.

In embodiments, the contextual data includes at least one of: an object recognition in the multimedia content at the time mentioned in the post; absolute time association with the time mentioned; natural language processing of contextual association with the time mentioned; association of the time mentioned with other comments; and association of the time mentioned with a magnitude of a time of the multimedia content. Additionally, the contextual association may include analyzing a verbiage of the time mentioned. Further, other comments may include comments from other users or from the same user.

At step 507, the timestamp validation detection device 404 of FIG. 4, scores the contextual data of the time indicating whether the time is a valid timestamp. In embodiments, each contextual data is scored assuming the identified time is an absolute time or a relative time. Thus, each contextual data includes an absolute time score and a relative time score. In embodiments, the absolute and relative time scores are compared against one another to determine which is the stronger indicator. In embodiments, both the absolute time and relative time scores are reflected by a negative to positive score range, where zero is between the absolute time and relative time scores and indicates the context data of the identified time is non-decisive. The more positive and more negative scores indicate the context data leans toward an absolute or relative time.

At step 509, the timestamp validation detection device 404 of FIG. 4, weights the scored contextual data that is used to generate a validity score. In embodiments, a weight factor is applied to the scores based on a confidence level in the score. If a context data is a strong indicator of an absolute or relative time, the weight factor is increased. If a context data is a weak indicator, the weight factor may be decreased. The total weight of all the scores (absolute time scores separate from relative time scores) provides a confidence level in the absolute time scores and relative time scores themselves. The summed weighted scores of the context data are then used to generate a validity score that compares the absolute time scores and relative times scores to indicate a confidence level in whether the identified time is an absolute time, relative time, or non-decisive. In other words, the validity score shows whether one score, the absolute time score or the relative time score is much more likely than the other, or if the results are inconclusive. In embodiments, the validity score is a difference between the two scores. In a non-limiting exemplary embodiment, the difference between the absolute time score and the relative time score is taken. If positive, then the validity score indicates absolute time. If negative, then the validity score indicates relative time. If near zero or zero, the validity score is non-decisive (i.e., inconclusive).

In embodiments, if the identified time is contextually analyzed to be non-decisive or an absolute time, the timestamp validation detection device 404 requests manual feedback from other viewers and commenters of the multimedia content (and/or in the hierarchy (i.e., replies) of the original post). For example, later commenters are provided a query directly asking whether the identified time is a timestamp or absolute time.

In embodiments, the default course of action is that the comment may not be posted until the user originating the post validates the timestamp. In embodiments, the default course of action for a post may be to include an interactive link, even if invalid, and allow the user to manually mark whether the identified time is a valid timestamp.

In embodiments, a triggering event may indicate that the timestamp should be re-evaluated. In embodiments, the triggering event may include a note in a later comment that the timestamp is not working correctly, the timestamp has no bearing to the linked context of the video, or is not a timestamp. In one exemplary embodiment, a reply in the hierarchy of the original post specifically notes that the identified time is not a timestamp. Thus, the timestamp validation detection device 404 would remove the timestamp as a link and return the time to an absolute time. For example, a comment includes "I woke up at 3:24." The time '3:24' is initially linked as a timestamp. However, a later comment notes "That time is not a timestamp." The timestamp validation detection device 404 then removes the timestamp link to '3:24,' based on the later comment. In embodiments, the later comment needs a predetermined number of upticks or votes from other viewers to be determined to be true before the timestamp link is removed. For example, the comment noting that the "time is not a timestamp" is flagged as a triggering event, however, three upticks or votes is needed before the timestamp link in the original post is removed.

At step 511, the timestamp validation detection device 404 of FIG. 4, determines a correlation between the time in the post to the multimedia content based on the analyzed contextual data. In embodiments, the timestamp validation detection device 404 determines that a correlation exists when the contextual data (and subsequently the validity score) indicates the identified time(s) is a relative time. In contrast, the timestamp validation detection device 404 determines that a correlation does not exist when the contextual data (and subsequently the validity score) indicates the identified time(s) is an absolute time.

At step 513, the timestamp validation detection device 404 of FIG. 4, generates an interactive link to the corresponding time of the multimedia content based on the correlation between the time in the post to the corresponding time of the multimedia content. When a correlation does exist, the timestamp validation detection device 404 generates an interactive link to the same time of the multimedia content. The generated interactive link is then published along with the original post for future interaction with readers of the post. The generated interactive link is a link to present the multimedia content beginning at the identified time.

In embodiments, and as described with respect to FIG. 4, the timestamp validation detection device 404 communicates with the multimedia service device(s) 406 to retrieve the post and/or other associated posts for analysis to generate a timestamp validity input based on other posts. In embodiments, the associated posts may include posts referencing the same time as the post. In embodiments, the associated posts are previous posts (i.e., historical comparison of posts) by the user with similar language. In embodiments, and as described with respect to FIG. 4, the timestamp validation detection device 404 communicates with the client device(s) 410 to receive a timestamp validity input based on users to determine whether the timestamp is valid. The users of the client device(s) 410 provide additional user input on the timestamp of the post in question. The timestamp validation detection device 404 sends a query to the client device(s) associated with the user that wrote the post and asks for verification that the post was or was not meant to be a timestamp for the multimedia content.

Figure 6:
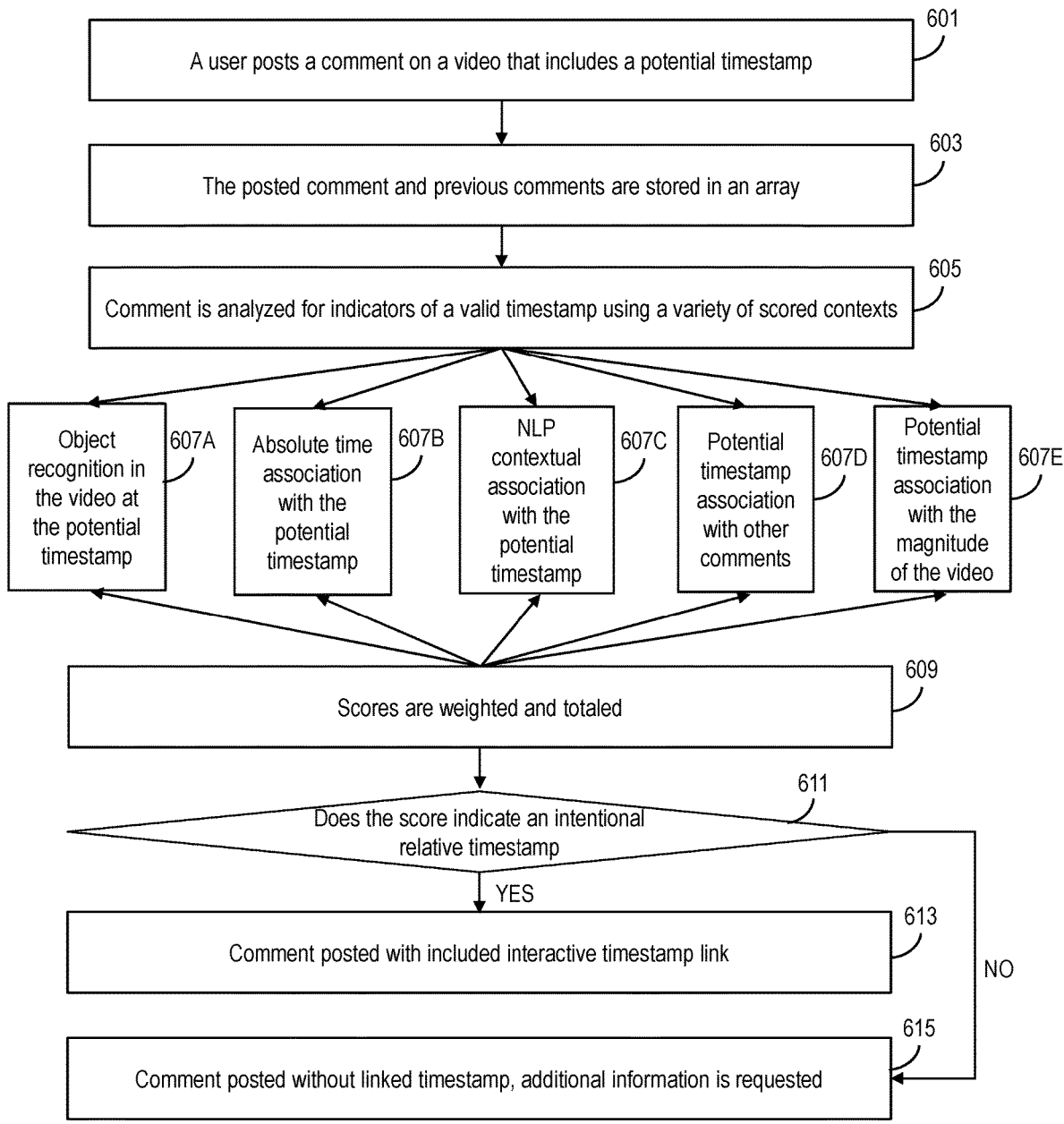
FIG. 6 shows a flowchart of another exemplary method in accordance with aspects of the invention.

FIG. 6 shows a flowchart of another exemplary method in accordance with aspects of the present invention. Steps of the method may be carried out in the environment of FIG. 4 and are described with reference to elements depicted in FIG. 4.

At step 601, the timestamp validation detection device 404 of FIG. 4, receives or retrieves a user posted comment on a video that includes a potential timestamp (i.e., an identified time).

At step 603, the timestamp validation detection device 404 of FIG. 4, stores the posted comment and any previous comments of the user in an array. The previous user comments may be analyzed with natural language processing models to determine previous usage/context in comments. These previous posts may also aid in identifying time(s) in the comments based on previously commented time usage.

At step 605, the timestamp validation detection device 404 of FIG. 4, analyzes the posted comment for indicators of a valid timestamp using a variety of scored contexts. The contexts include contextual information of both the comment itself and the associated video. The contexts are scored based on a whether the context indicates an absolute or relative time.

Contexts are described further in steps 607A-E. In steps 607A-E, the timestamp validation detection device 404 of FIG. 4, analyzes the video for object recognition at or near the potential timestamp (step 607A); determines associations between the potential timestamp and the absolute time (step 607B); uses natural language processing to associate contextual language in the comment to the potential timestamp (step 607C); determines other comments from other users with the same or similar timestamp to the potential timestamp (step 607D); and determines whether the potential timestamp falls within the magnitude of the video (step 607E). Each of the contexts are scored assuming the potential timestamp is an absolute or relative time.

At step 609, the timestamp validation detection device 404 of FIG. 4 weights and totals the scores. Each of the scored contexts are weighted situationally based on how much the context indicates absolute or relative time. In a non-limiting exemplary embodiment, if the same timestamp is used by other commenters, it is much more likely that the potential timestamp is a relative timestamp (i.e., the potential timestamp is a relative time) and thus this indicating factor is weighted more heavily than if the same timestamp is similar in time to the current (absolute) time of the post. For example, a timestamp of 3:02 is used by other commenters is considered in context against a current time of 3:04 PM. The usage by other comments is heavily weighted toward a relative time over the potential equivalence of the timestamp to the current time of 3:04 PM.

At step 611, the timestamp validation detection device 404 of FIG. 4, determines whether the weighted scores indicate an intentional relative timestamp (i.e., the posting user wanted the potential timestamp to refer to a time in the video). The weighted scores may be totaled to determine whether the scores indicate a relative timestamp. As the scores are totaled, a higher absolute time weighted score than a relative time weighted score indicates that the potential timestamp is not likely a relative timestamp. If the weighted scores are similar, then no decision can be made and input from the commenter or other commenters is needed.

At step 613, if the weighted scores indicate an intentional relative timestamp, then the system posts the comment with an interactive link/pointer to the time of the timestamp for the video. In embodiments, the interactive link for the timestamp brings other users/viewers to the same time in the video.

At step 615, if the weighted scores indicate an absolute timestamp (i.e., that potential timestamp is found to be an absolute time), then the system posts the comment without a linked timestamp and/or additional information is requested. In embodiments, if the timestamp is an absolute timestamp or non-decisive, then additional information is requested from the commenter to either manually link to a time of the video or leave the timestamp unlinked.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device, a post referring to a multimedia content;
identifying, by the computing device, a time in the post by analyzing a text in the post including dates and/or times embedded in the post;
generating, by the computing device, a validity score based on analyzing contextual data utilizing a machine learning model of the time in the post and contextual data of a corresponding time in the multimedia content, the validity score indicating whether the time in the post is a valid timestamp;
determining, by the computing device, a correlation between the time in the post to the corresponding time in the multimedia content based on the validity score, the correlation indicating the time as a relative time that indicates the time in the post be used as an interactive link to provide a pointer to the corresponding time in the multimedia content; and
publishing, by the computing device, the post with the interactive link to the corresponding time of the multimedia content based on the determined correlation.

2. The computer-implemented method of claim 1, wherein the analyzing of the contextual data of the time in the post comprises scoring based on one or more selected from the group consisting of:
multimedia content processing that determines a relationship between the time in the post and the multimedia content;
natural language processing of the post;
historical comparison of the post to other posts;
time magnitude comparison of the time in the post to a completed playback time of the multimedia content; and
comparison of the time in the post to another time in the post.

3. The computer-implemented method of claim 2, wherein the natural language processing includes Bidirectional Encoder Representation from Transformers (BERT) model processing.

4. The computer-implemented method of claim 2, wherein the multimedia content processing includes multimedia content processing of the multimedia content at and near the time to extract entities within the multimedia content to which the post may refer.

5. The computer-implemented method of claim 2, further comprising:
  determining a difference between a time format of the multimedia content and a time format of the time in the post.

6. The computer-implemented method of claim 2, wherein the natural language processing compares extracted elements from the post to metadata of the multimedia content.

7. The computer-implemented method of claim 2, wherein the scoring includes relative time scores determined based on the time in the post being a valid timestamp that indicates the time in the post be used as the interactive link to provide the pointer to the corresponding time in the multimedia content, and absolute time scores determined based on the time in the post being an absolute time that indicates the time in the post is an actual time.

8. The computer-implemented method of claim 1, further comprising:
  requesting, by the computing device, a timestamp validity input from a posting user of the post or from other users of the post.

9. The computer-implemented method of claim 1, further comprising:
  receiving, by the computing device, a timestamp validity input from other users of the post indicating a triggering event to re-evaluate the identified time for the correlation.

10. The computer-implemented method of claim 1, wherein the multimedia content comprises a video, the post comprises a comment about the video, and the link comprises a user-selectable link to the time in the video.

11. A computer program product comprising one or more computer readable storage media having program instructions collectively stored on the one or more computer readable storage media, the program instructions executable to:
  receive a post referring to a video;
  identify a time in the post;
  generate a validity score based on analyzing contextual data of the time in the post and a corresponding time in the video, the validity score indicating whether the time in the post is a valid timestamp;
  responsive to determining a correlation between the time in the post to a corresponding time of the video based on the validity score, publish the post with an interactive link to the corresponding time in the video, the correlation indicating the time as a relative time; and
  responsive to determining a lack of the correlation between the time in the post to the corresponding time of the video based on the validity score, publish the time in the post as text without the interactive link, the lack of the correlation indicating the time in the post is an absolute time and should not be linked to the video.

12. The computer program product of claim 11, wherein the analyzing of the contextual data of the time in the post comprises scoring based on one or more selected from the group consisting of:
  video processing that determines a relationship between the time in the post and the video;
  natural language processing of the post;
  historical comparison of the post to other posts;
  time magnitude comparison of the time in the post to a completed playback time of the video; and
  comparison of the time in the post to another time in the post.

13. The computer program product of claim 12, wherein the natural language processing includes Bidirectional Encoder Representation from Transformers (BERT) model processing.

14. The computer program product of claim 12, wherein the video analysis includes video processing of the video at and near the time in the post to extract entities within the video to which the post may refer.

15. The computer program product of claim 12, wherein the program instructions are executable to:
  determine a difference between a time format of the video and a time format of the time in the post.

16. A system comprising:
  a processor, a computer readable memory, one or more computer readable storage media, and program instructions collectively stored on the one or more computer readable storage media, the program instructions executable to:
  receive a post referring to a multimedia content;
  identify a time in the post, wherein the time is embedded in the post;
  analyze contextual data of the time in the post, the analyzing including:
    scoring the contextual data of the time in the post indicating whether the time in the post is a valid timestamp and a corresponding time in the multimedia content, and
    weighting the scored contextual data to generate a validity score, the validity score indicating whether the time in the post is a valid timestamp;
  determine a lack of correlation between the time in the post to a corresponding time in the multimedia content based on the validity score, the lack of the correlation indicating the time as an absolute time; and
  publish the time in the post as text without an interactive link.

17. The system of claim 16, wherein the scoring is based on one or more selected from the group consisting of:
  multimedia content processing that determines a relationship between the time in the post and the multimedia content;
  natural language processing of the post;
  historical comparison of the post to other posts;
  time magnitude comparison of the time in the post to a completed playback time of the multimedia content; and
  comparison of the time in the post to another time in the post.

18. The system of claim 17, wherein the natural language processing includes Bidirectional Encoder Representation from Transformers (BERT) model processing.

19. The system of claim 17, wherein the program instructions are executable to:
  determine a difference between a time format of the multimedia content and a time format of the time in the post.

20. The system of claim 17, wherein the scoring is also based on:
  another time magnitude comparison including a comparison of a temporal location in the multimedia content indicating a progress of a user during a playback of the multimedia content to the time in the post by the program instructions being further executable to:
  track the progress of the user watching the playback of the multimedia content; and compare the time of the post to the progress during the playback of the multimedia content.

* * * * *